United States Patent
Hartenstine et al.

(10) Patent No.: US 8,505,956 B2
(45) Date of Patent: Aug. 13, 2013

(54) STROLLER

(75) Inventors: Curtis M. Hartenstine, Central (HK); Justin L. Rigg, Central (HK); Jonathan M. Pacella, Central (HK)

(73) Assignee: Wonderland Nurserygoods Company Limited, Central (HK)

( * ) Notice: Subject to any disclaimer, the term of this patent is extended or adjusted under 35 U.S.C. 154(b) by 297 days.

(21) Appl. No.: 12/729,253

(22) Filed: Mar. 23, 2010

(65) Prior Publication Data

US 2010/0237591 A1    Sep. 23, 2010

Related U.S. Application Data

(60) Provisional application No. 61/210,856, filed on Mar. 23, 2009.

(51) Int. Cl.
*B62B 7/06* (2006.01)

(52) U.S. Cl.
USPC ........... 280/642; 280/648; 280/650; 280/658; 280/47.38

(58) Field of Classification Search
USPC ................ 280/642, 648, 647, 650, 657, 658, 280/47.38, 47.4, 304.1
See application file for complete search history.

(56) References Cited

U.S. PATENT DOCUMENTS

| | | | |
|---|---|---|---|
| 2008/0079240 A1* | 4/2008 | Yeh | 280/642 |
| 2008/0185821 A1* | 8/2008 | Chen et al. | 280/642 |
| 2008/0211206 A1 | 9/2008 | Thorne | |
| 2009/0058026 A1 | 3/2009 | Park | |
| 2009/0243261 A1 | 10/2009 | Sousa | |
| 2011/0248478 A1* | 10/2011 | Thorne et al. | 280/650 |

FOREIGN PATENT DOCUMENTS

| | | |
|---|---|---|
| CN | 1594003 A | 3/2005 |
| CN | 2835029 Y | 11/2006 |
| CN | 2839061 Y | 11/2006 |
| CN | 2910719 Y | 6/2007 |
| EP | 1 366 968 A1 | 12/2003 |
| EP | 1366968 B1 | 4/2005 |
| EP | 1842759 A2 | 10/2007 |
| EP | 1466810 B1 | 7/2008 |
| EP | 2014536 A1 | 1/2009 |
| NL | 1025569 | 2/2004 |

* cited by examiner

*Primary Examiner* — Jeffrey J Restifo
*Assistant Examiner* — Erez Gurari
(74) *Attorney, Agent, or Firm* — Winston Hsu; Scott Margo

(57) ABSTRACT

A stroller includes a lower carriage, an upper carriage and a foldable support assembly. The upper carriage is pivotally connected to the lower carriage. The foldable support assembly comprises a connecting member, an upper support member and a lower support member. One end of the upper support member is pivotally connected to the upper carriage. One end of the lower support member is pivotally connected to the lower carriage. At least one of the other end of the upper support member and the other end of the lower support member is pivotally connected to the connecting member.

22 Claims, 16 Drawing Sheets

STROLLER

CROSS REFERENCE TO RELATED APPLICATIONS

This application claims the benefit of U.S. Provisional Applications No. 61/210,856, which was filed on Mar. 23, 2009, and is incorporated herein by reference.

BACKGROUND OF THE INVENTION

1. Field of the Invention

The invention relates to a stroller and, more particularly, to a stroller having the ruggedness, features and safety of a full-sized stroller but light-weighted, whereas meeting the size requirements of a compact stroller.

2. Description of the Prior Art

Parents use strollers to transport babies and small children while shopping and walking. They are typically constructed of a metal frame, which consists of a combination of assembled metal and plastic components, and a fabric body which connects or wraps around the frame. When not in use, most strollers can be folded for storage or transport. They offer a great convenience with many features such as a comfortable reclining seat for the child, storage and cup holders for both parents and child and storage basket for diaper bags and other necessities.

There are a variety of folding strollers available in the market today in many different categories, including compact and lightweight, or full-sized. Full size strollers typically are more appealing because they offer more room for the child, better ergonomics for parents, more functional features, and a more robust frame. The problem with full size strollers is that when folded, they occupied more space. This makes it difficult to accommodate the myriad items parents wish to take with them while traveling in a vehicle. Besides, full size strollers can also be very heavy. Taking a heavy stroller in and out of a trunk is not only cumbersome, but can risk of back injury, especially because new moms may already have a weak back from child bearing.

Lightweight strollers are mainly used as a child transportation device for a parent who is on the go. Many of these on-the-go parents have a lightweight stroller as their second stroller, which is left in the trunk of their vehicle for the majority of the time. The fabric offers support for the seating area. The category is appealing for lightweight, compact folding and fashion though storage, tray and cover are removed.

Therefore, both of the aforementioned categories (lightweight and full size) end up need to sacrifice some features rather than multifunctional. Two types of strollers are often prepared for different use such that additional expense is created.

SUMMARY OF THE INVENTION

An objective of the invention is to provide a stroller having the ruggedness, features and safety of a full-sized stroller, but when folded, meeting the weight and size requirements of a compact stroller.

According to one embodiment, a stroller of the invention comprises a lower carriage, an upper carriage and a foldable support assembly. The upper carriage is pivotally connected to the lower carriage. The foldable support assembly comprises a connecting member, an upper support member and a lower support member. One end of the upper support member is pivotally connected to the upper carriage. One end of the lower support member is pivotally connected to the lower carriage. At least one of the other end of the upper support member and the other end of the lower support member is pivotally connected to the connecting member.

In this embodiment, the connecting member may comprise an operating portion. When the operating portion is actuated, the upper support member rotates with respect to the upper carriage and the lower support member rotates with respect to the lower carriage and the connecting member, so as to fold down the upper carriage onto the lower carriage.

In another embodiment, the upper carriage may comprise a folding mechanism. One end of the upper support member is pivotally connected to the upper carriage through the folding mechanism. The other end of the upper support member is pivotally connected to the connecting member. Two lower support members are connected to the connecting member in a fixing-angled orientation. The connecting member has two grooves, and each of the two lower support members is pivotally connected in one groove of the connecting member correspondingly. A fixed angle is between the two lower support members while the two lower support members rotate with respect to the connecting member. The lower support members are also pivotally connected to the rear legs by means of mount brackets. Furthermore, the folding mechanism comprises a mount, a pivoting actuator and a drive link. The drive link is mounted rigidly to the upper support member and to the pivoting actuator. The stroller may further comprise a handle frame rigidly connected to the pivoting actuator. When the handle frame rotates forward, the pivoting actuator controls the drive link to rotate which in turn causes the upper support member to rotate forward, so as to fold down the upper carriage onto the lower carriage.

In another embodiment, a stroller of the invention comprises a lower carriage, an upper carriage, a handle frame and a foldable support assembly. The upper carriage is pivotally connected to the lower carriage. The handle frame is connected to the upper carriage in a telescoping manner. The foldable support assembly comprises a connecting member, an upper support member and a lower support member. One end of the upper support member is pivotally connected to the upper carriage. One end of the lower support member is pivotally connected to the lower carriage. At least one of the other end of the upper support member and the other end of the lower support member is pivotally connected to the connecting member.

In another embodiment, a stroller of the invention comprises a lower carriage, an upper carriage and a foldable support assembly. The lower carriage comprises a front wheel frame and two rear legs, wherein the two rear legs are connected to the front wheel frame horizontally via a mounting member, and the two rear legs are pivotally connected to the mounting member such that the two rear legs are rotatable inwardly to each other. The upper carriage is pivotally connected to the lower carriage. The foldable support assembly comprises a connecting member, an upper support member and a lower support member. One end of the upper support member is pivotally connected to the upper carriage. One end of the lower support member is pivotally connected to the lower carriage. At least one of the other end of the upper support member and the other end of the lower support member is pivotally connected to the connecting member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
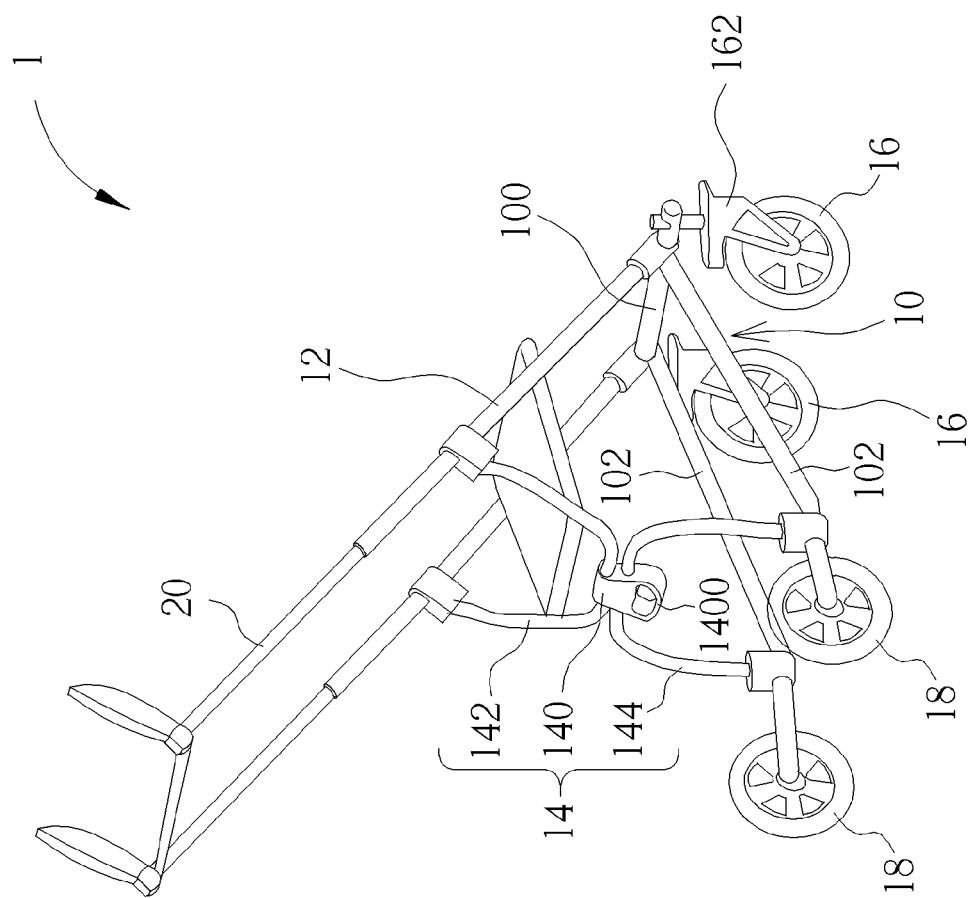
FIG. 1 is a perspective view illustrating a stroller according to one embodiment of the invention.
Figure 2:
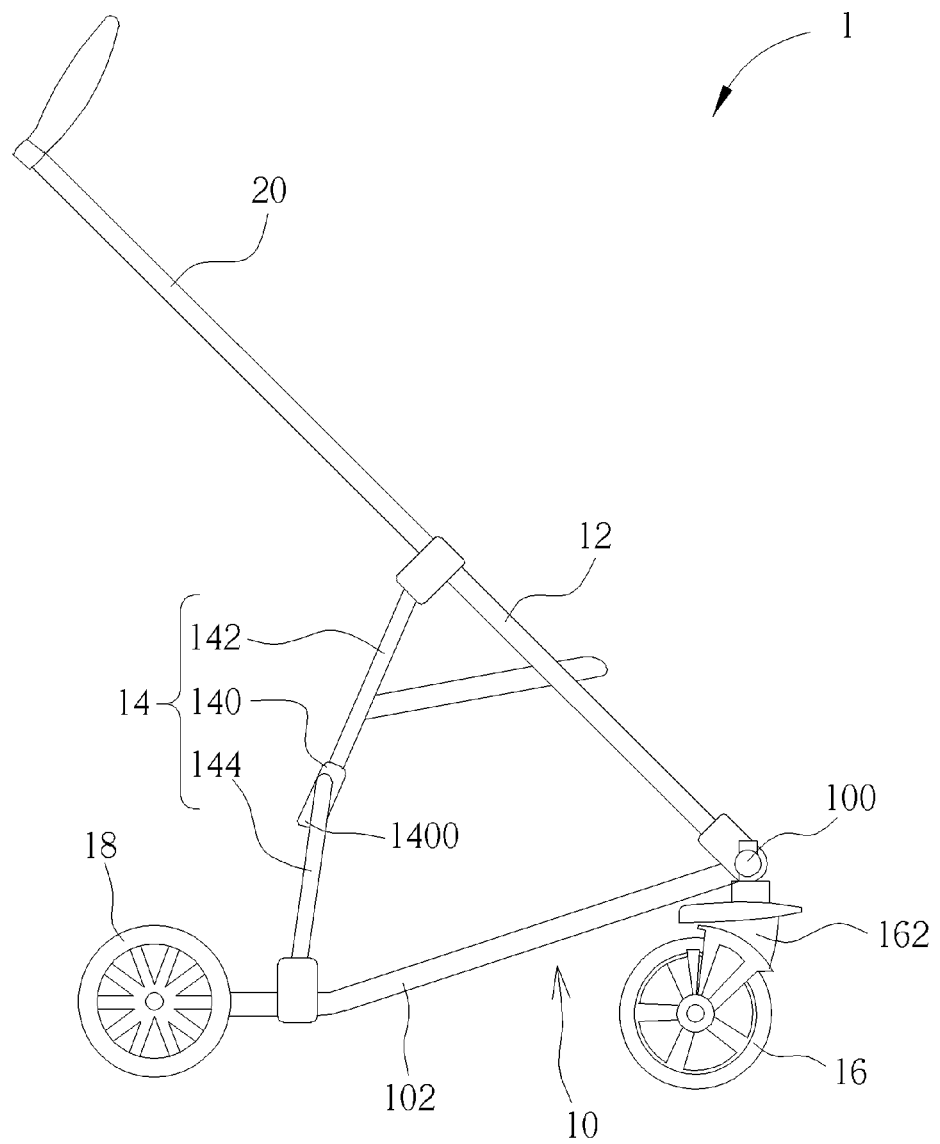
FIG. 2 is a side view illustrating the stroller shown in FIG. 1.

Referring to FIGS. 1 and 2, FIG. 1 is a perspective view illustrating a stroller 1 according to one embodiment of the invention, and FIG. 2 is a side view illustrating the stroller 1 shown in FIG. 1. As shown in FIGS. 1 and 2, the stroller 1 comprises a lower carriage 10, an upper carriage 12, a foldable support assembly 14, two front wheels 16, two rear wheels 18 and a handle frame 20.

The lower carriage 10 comprises a front wheel frame 100 and two rear legs 102. The two rear legs 102 are connected to the front wheel frame 100 horizontally. The connection between the rear legs 102 and front wheel frame 100 can be achieved by a rigid mechanical assembly such as riveted brackets or by welding. The rear leg 102 is also attached to a rear wheel mounting assembly for facilitating the attachment of rear wheels 18. The front wheels 16 are pivotally connected to the front wheel frame 100, such that each of the front wheels 16 can swivel with respect to the lower carriage 10. The lower carriage 10 provides the frame work for the mounting of the front and rear wheels 16 and 18, providing the stroller 1 with the ability to roll smoothly when pushed. The lower carriage 10 also provides a structural means for the attachment of a storage basket (not shown).

The upper carriage 12 is pivotally connected to the lower carriage 10 at the front wheel frame 100, which allows these members to fold in relationship to one another. The upper carriage 12 includes frame side members projecting in an upward and rearward direction. These frame side members provide the structural support for the attachment of the stroller seat, canopy and other accessory (not shown). Furthermore, the handle frame 20 is connected to the upper carriage 12 in a telescoping manner. That is to say, the handle frame 20 is connected to the upper carriage 12 in a way that allows them to telescope down into the upper carriage 12 to provide a more compact folding size. It should be noted that, in another embodiment, the handle frame 20 may be pivotally connected to the upper carriage 12 such that it allows the handle frame 20 to fold over onto the upper carriage 12 and it would also achieve a similar result. In this embodiment, the upper carriage 12 may also make accommodations for rotatably adjustable handles for the comfort of the user.

The foldable support assembly 14 comprises a connecting member 140, an upper support member 142 and a lower support member 144. In this embodiment, the upper support member 142 and the lower support member 144 may be, but not limited to, U-shaped tubes, as shown in FIG. 1. One end of the upper support member 142 is pivotally connected to the upper carriage 12. In a similar manner, one end of the lower support member 144 is pivotally connected to the lower carriage 10. Besides, at least one of the other end of the upper support member 142 and the other end of the lower support member 144 is pivotally connected to the connecting member 140. In practical application, the connecting member 140 may be fixed to the upper support member 142 by rivets but can rotate about the lower support member 144. The connecting member 140 comprises an operating portion 1400 that allows the user to grab it and pull in a rearward direction, causing the foldable support assembly 14 to articulate allowing the upper carriage 12 to fold down onto the lower carriage 10. But the invention is not limited to abovementioned embodiment. The connecting member 140 may be rotated about upper support member 142 and fixed to lower support member 144 by rivet. Otherwise, the connecting member 140 can rotate about both upper support member 142 and lower support member 144.

The foldable support assembly 14 forms an over-center mechanism when in the in-use position, as shown in FIG. 2, with the two U-shaped upper support member 142 and lower support member 144 resting on hard stops in the pivot joints. Because of this, the locking mechanism in the foldable support assembly 14 is not under a lot of stress when in-use.

Figure 3:
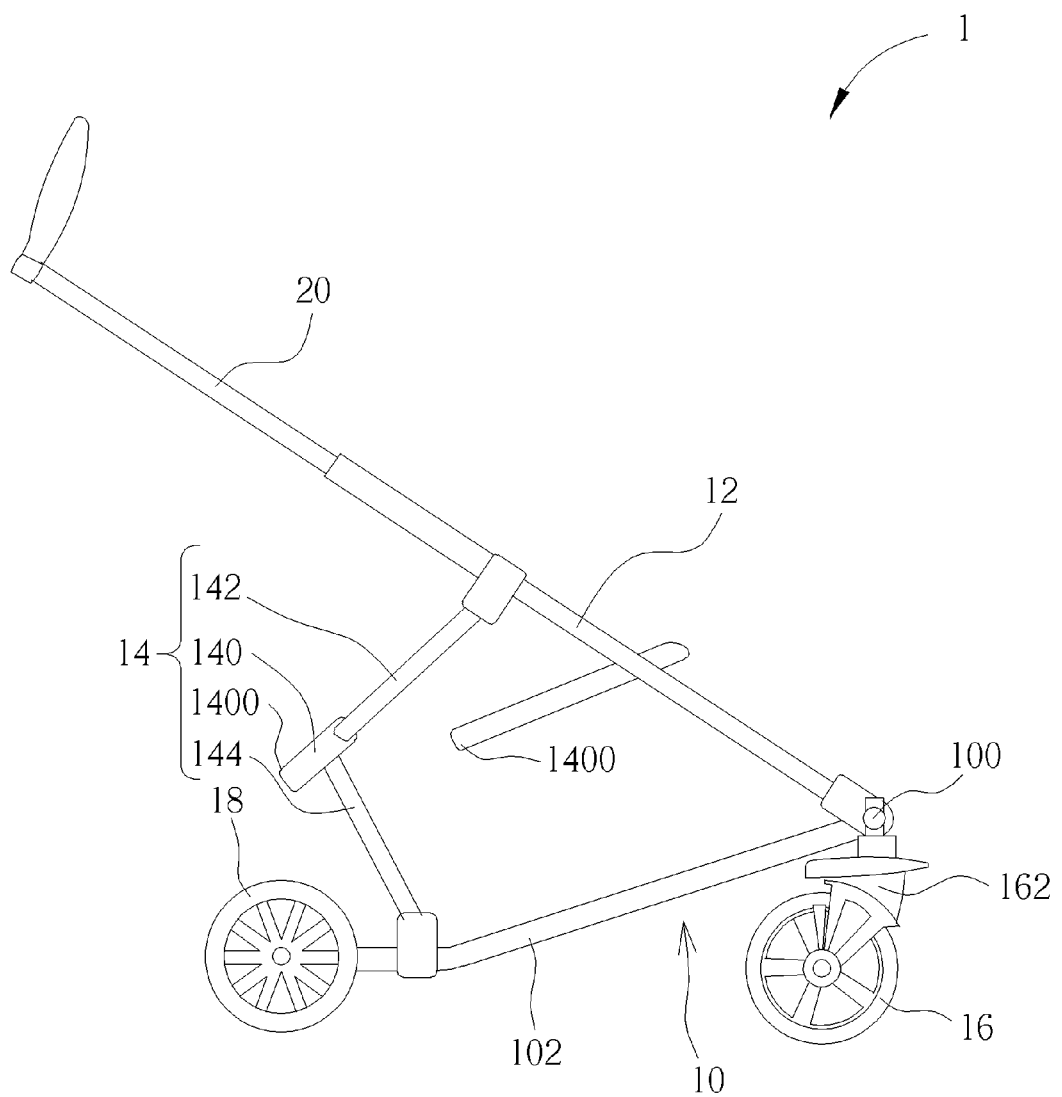
FIG. 3 is a side view illustrating the stroller in a partially folded orientation.
Figure 4:
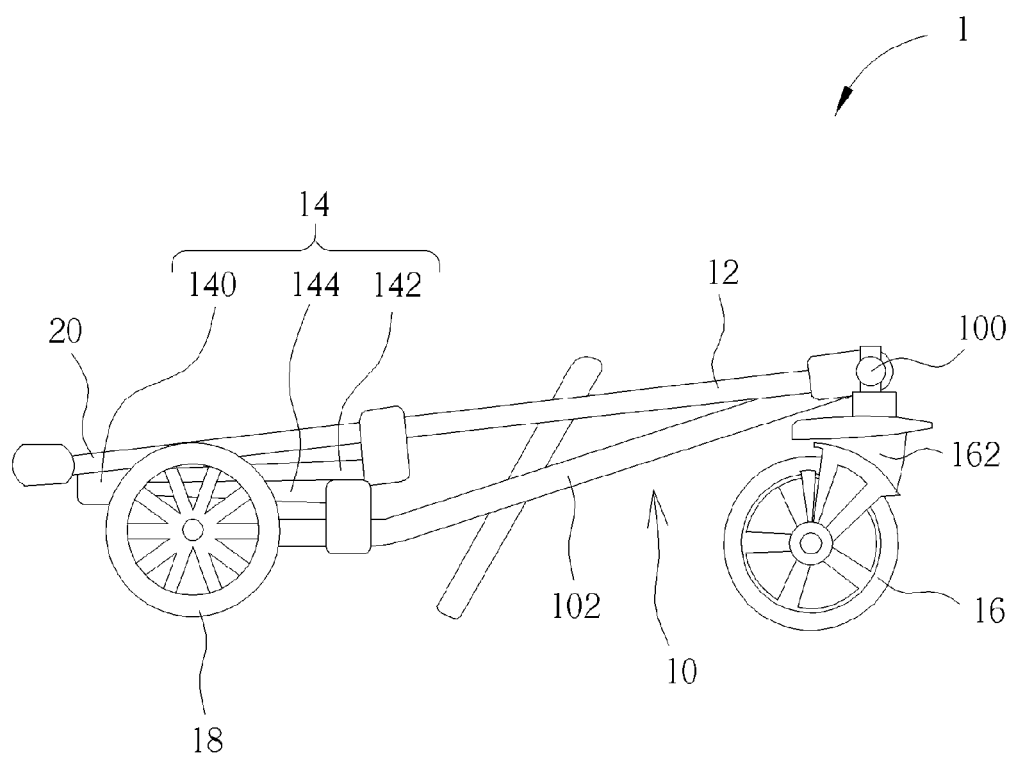
FIG. 4 is a side view illustrating the stroller in a completely folded orientation.

Referring to FIGS. 3 and 4, FIG. 3 is a side view illustrating the stroller 1 in a partially folded orientation, and FIG. 4 is a side view illustrating the stroller 1 in a completely folded orientation. As shown in FIGS. 3 and 4, when the operating portion 1400 is pulled, the upper support member 142 rotates with respect to the upper carriage 12 and the lower support member 144 rotates with respect to the lower carriage 10 and the connecting member 140, so as to fold down the upper carriage 12 onto the lower carriage 10. In this embodiment, the handle frame 20 can be adjusted to its telescoped (or folded) position to reduce the overall size of the folded stroller 1, as shown in FIG. 4. In this embodiment, each of the two front wheels 16 substantially has a flat side surface 162, such that the entire folded stroller 1 can then be erected to stand on the flat side surface 162 of each front wheel 16 allowing the folded stroller 1 to be positioned in a convenient vertical orientation for storage or transport.

Figure 5:
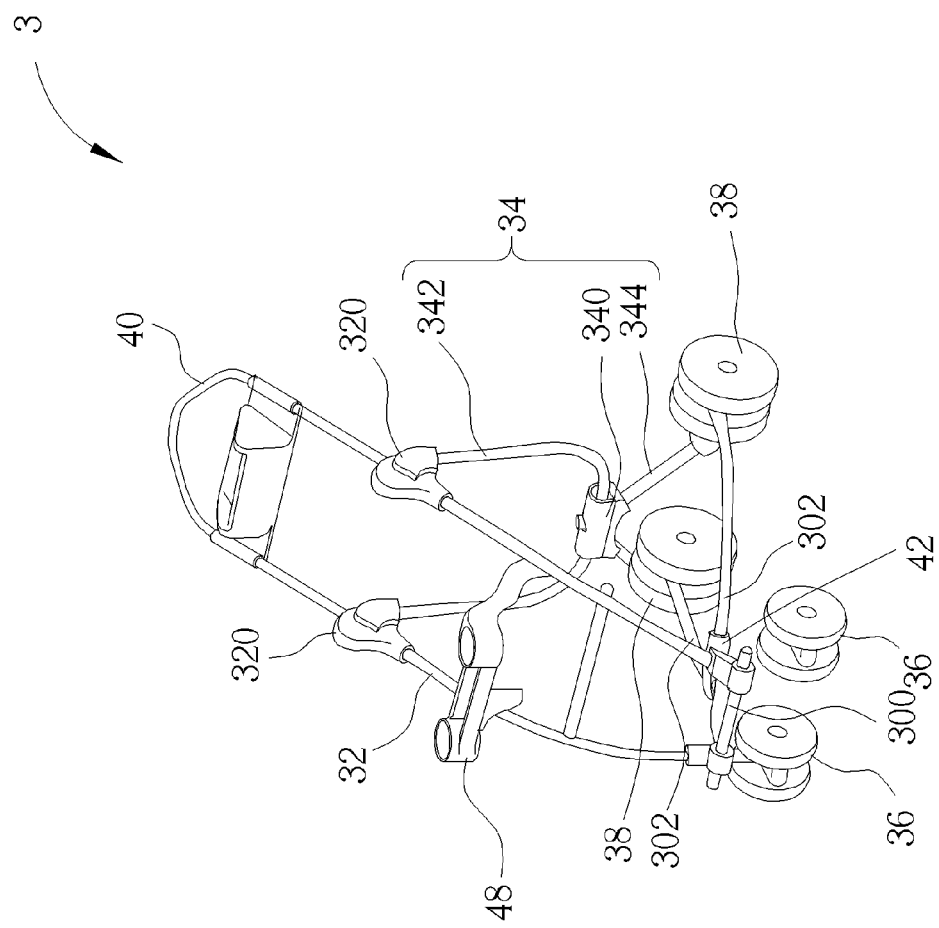
FIG. 5 is a perspective view illustrating a stroller according to another embodiment of the invention.
Figure 6:
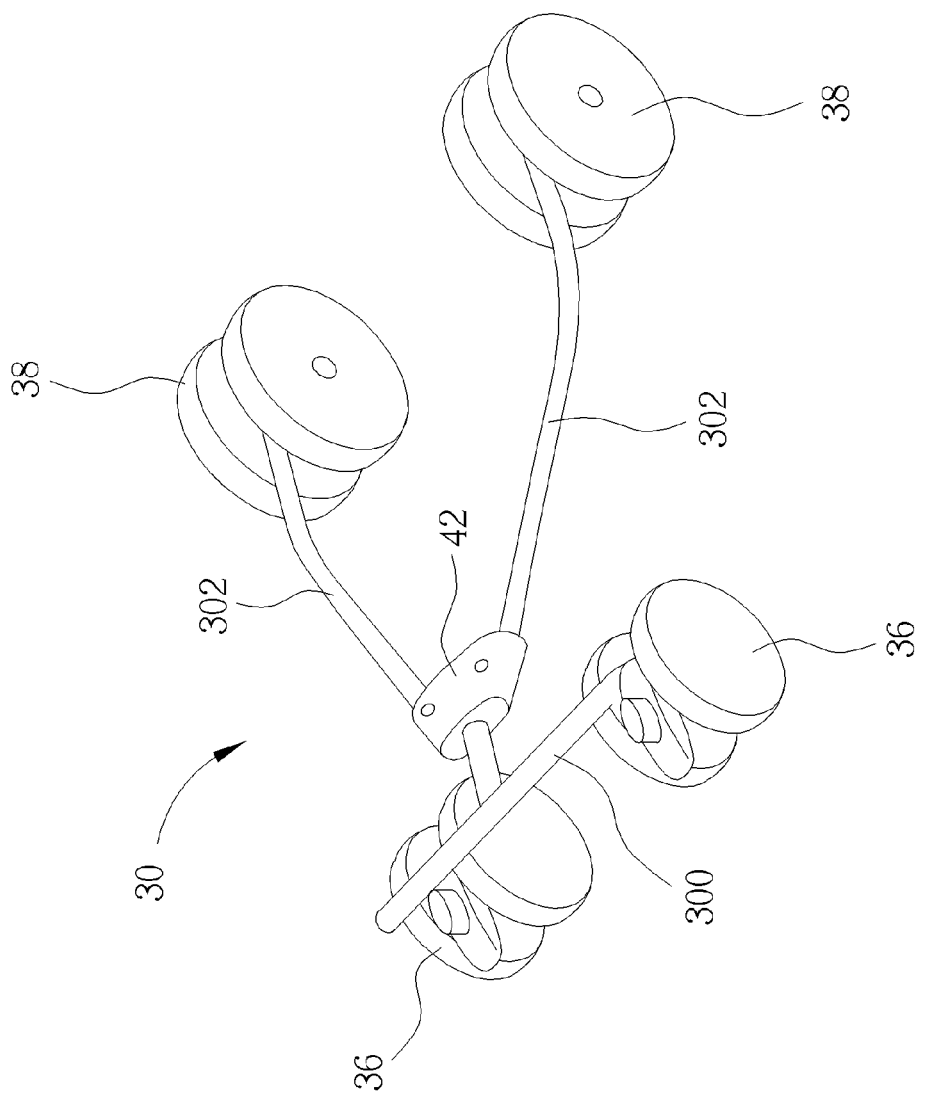
FIG. 6 is a perspective view illustrating the lower carriage of the stroller shown in FIG. 5.

Referring to FIGS. 5 and 6, FIG. 5 is a perspective view illustrating a stroller 3 according to another embodiment of the invention, and FIG. 6 is a perspective view illustrating the lower carriage 30 of the stroller 3 shown in FIG. 5. As shown in FIG. 5, the stroller 3 comprises a lower carriage 30, an upper carriage 32, a foldable support assembly 34, two front wheels 36, two rear wheels 38 and a handle frame 40.

The lower carriage 30 comprises a front wheel frame 300 and two rear legs 302. The two rear legs 302 are connected to the front wheel frame 300 horizontally via a mounting member 42 that allows the two rear legs 302 to rotate inwardly and also positions the front wheel frame 300. Each rear leg 302 is also attached to a detachable rear wheel mount assembly for facilitating the attachment of rear wheels 38. The lower carriage 30 provides the frame work for the mounting of the front and rear wheels 36 and 38 providing the stroller 3 with the ability to roll smoothly when pushed, as shown in FIG. 6. The lower carriage 30 also provides a structural means for the attachment of a storage basket (not shown).

The upper carriage 32 is pivotally connected to the lower carriage 30 at the front wheel frame 300, which allows these members to fold in relationship to one another. The upper carriage 32 includes frame side members projecting in an upward and rearward direction. These frame side members provide the structural support for the attachment of the stroller seat, canopy and other accoutrements (not shown). The upper portion of the frame side members terminate at a folding mechanism 320, as shown in FIG. 5.

Figure 7:
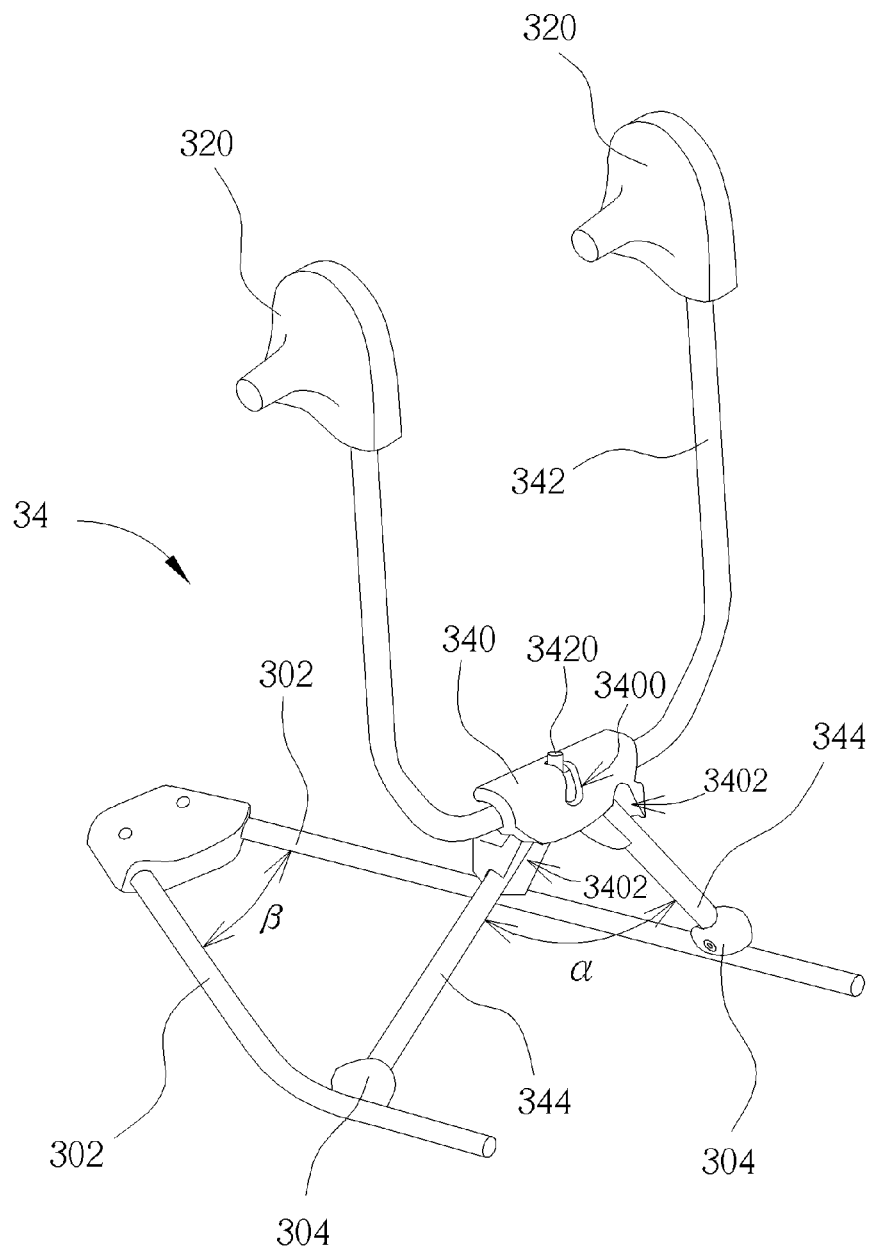
FIG. 7 is a perspective view illustrating the foldable support assembly of the stroller shown in FIG. 5.
Figure 8:
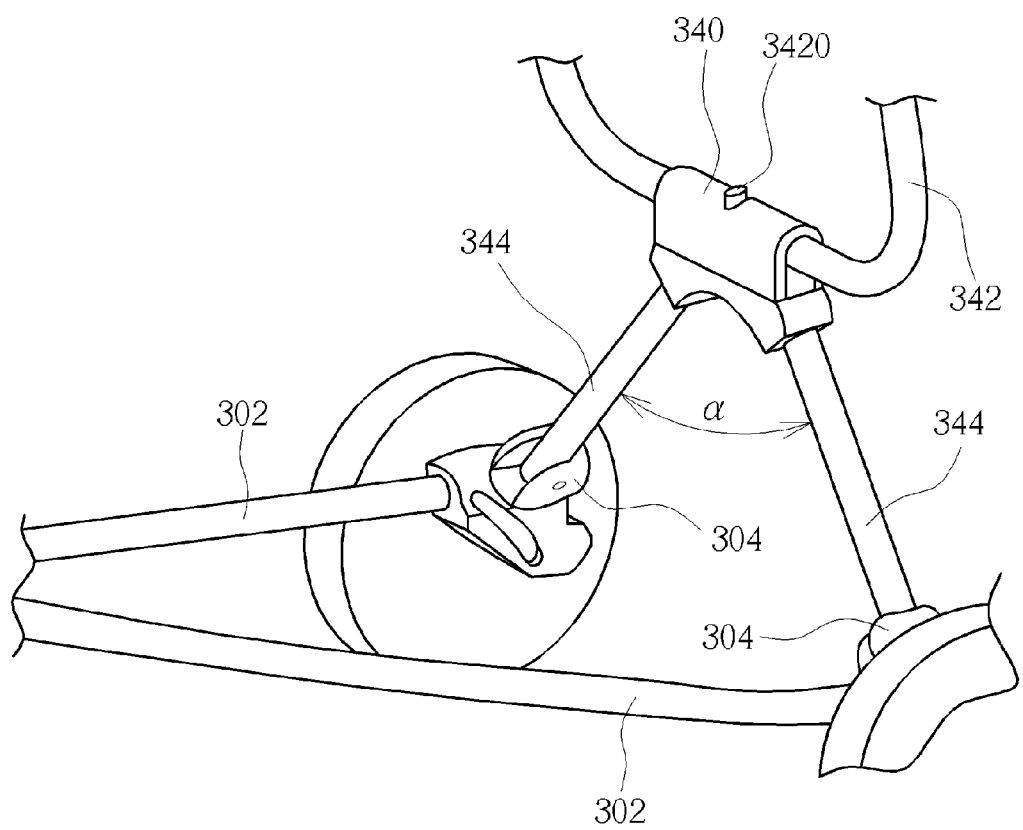
FIG. 8 is a perspective view illustrating the foldable support assembly shown in FIG. 7 in another view angle.

Referring to FIGS. 7 and 8, FIG. 7 is a perspective view illustrating the foldable support assembly 34 of the stroller 3 shown in FIG. 5, and FIG. 8 is a perspective view illustrating the foldable support assembly 34 shown in FIG. 7 in another view angle. As shown in FIGS. 7 and 8, the foldable support assembly 34 comprises a connecting member 340, an upper support member 342 and two lower support members 344. In this embodiment, the upper support member 342 may be, but not limited to, U-shaped tubes, as shown in FIG. 7. One end of the upper support member 342 is pivotally connected to the upper carriage 32 through the folding mechanism 320. The other end of the upper support member 342 is pivotally connected to the connecting member 340. The upper support member 342 has a protruding member 3420 disposed in a slot 3400 of the connecting member 340. The slot 3400 allows the protruding member 3420 to rotate along with the upper support member 342 in the unfolded and folded positions, so as to limit the rotation of the upper support member 342 to a specific range. The two lower support members 344 are connected to the connecting member 340 in a fixing-angled orientation. As shown in FIG. 7, the connecting member 340 has two grooves 3402, and each of the two lower support members 344 is pivotally connected in one groove 3402 of the connecting member 340 correspondingly. As shown in FIGS. 7 and 8, a fixed angle α is between the two lower support members 344 while the two lower support members 344 rotate with respect to the connecting member 340. The central axis of each of the lower support members 344 is generally parallel to the rear face of the foldable support assembly 34 when the stroller 3 is set up for use. The lower support members 344 are also pivotally connected to the rear legs 302 by means of mount brackets 304, as shown in FIG. 7. The central axis of the lower support members 344 is generally perpendicular to those of the rear legs 302 at the point of connection when the stroller 3 is set up for use.

Figure 9:
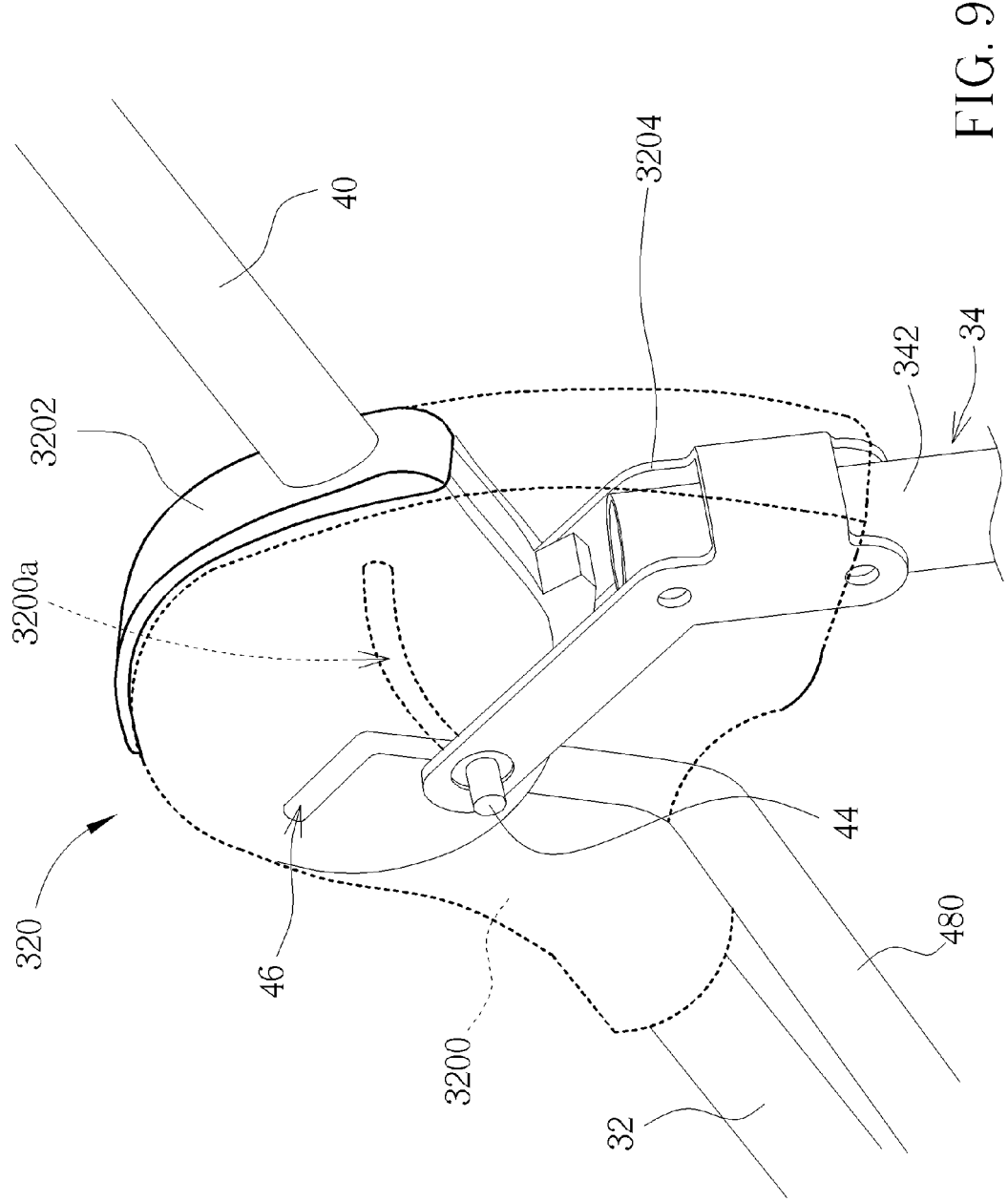
FIG. 9 is a schematic diagram illustrating the folding mechanism shown in FIG. 5.
Figure 10:
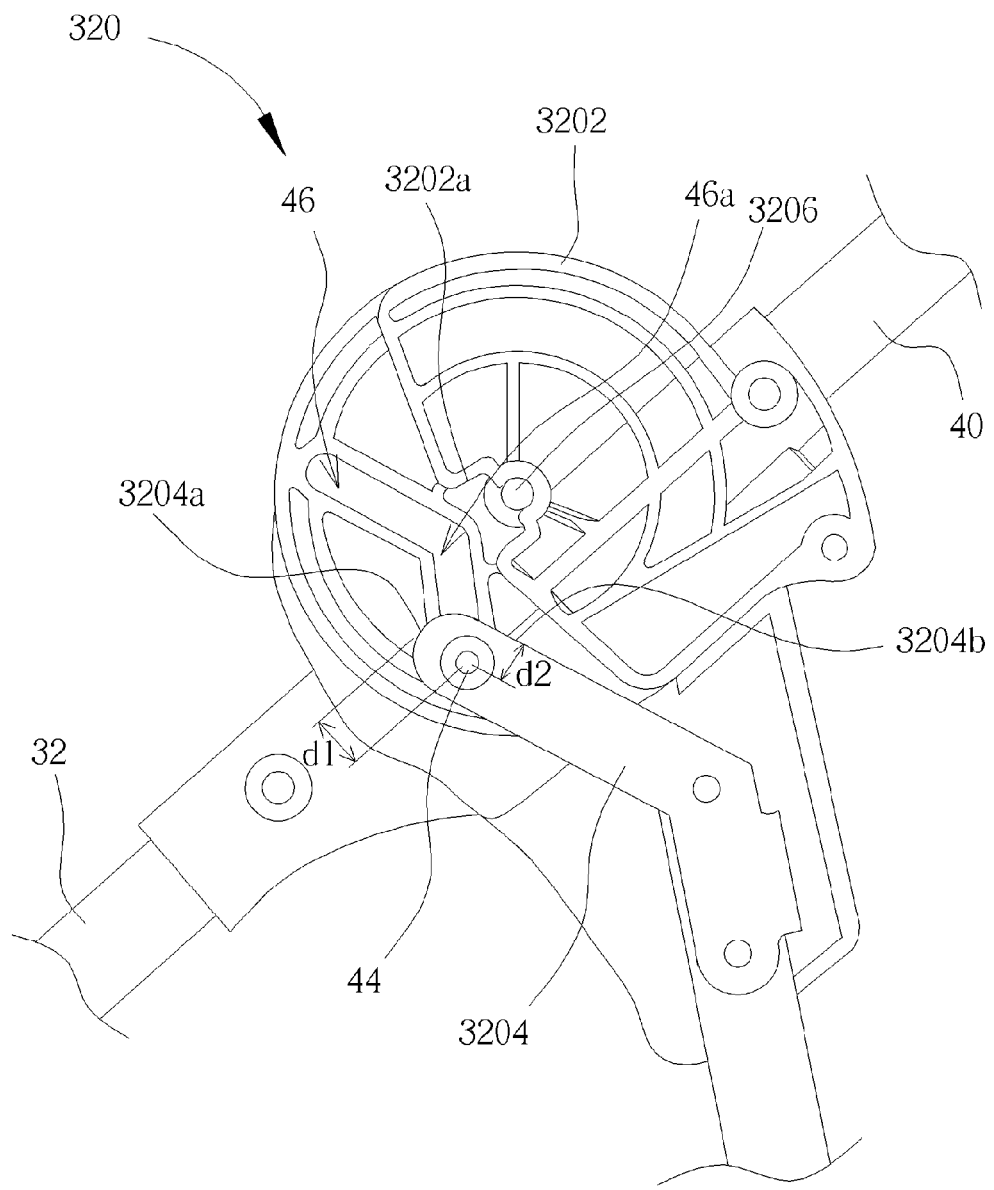
FIGS. 10 to 12 show inside details of the folding mechanism as it goes through its fold sequence.
Figure 11:
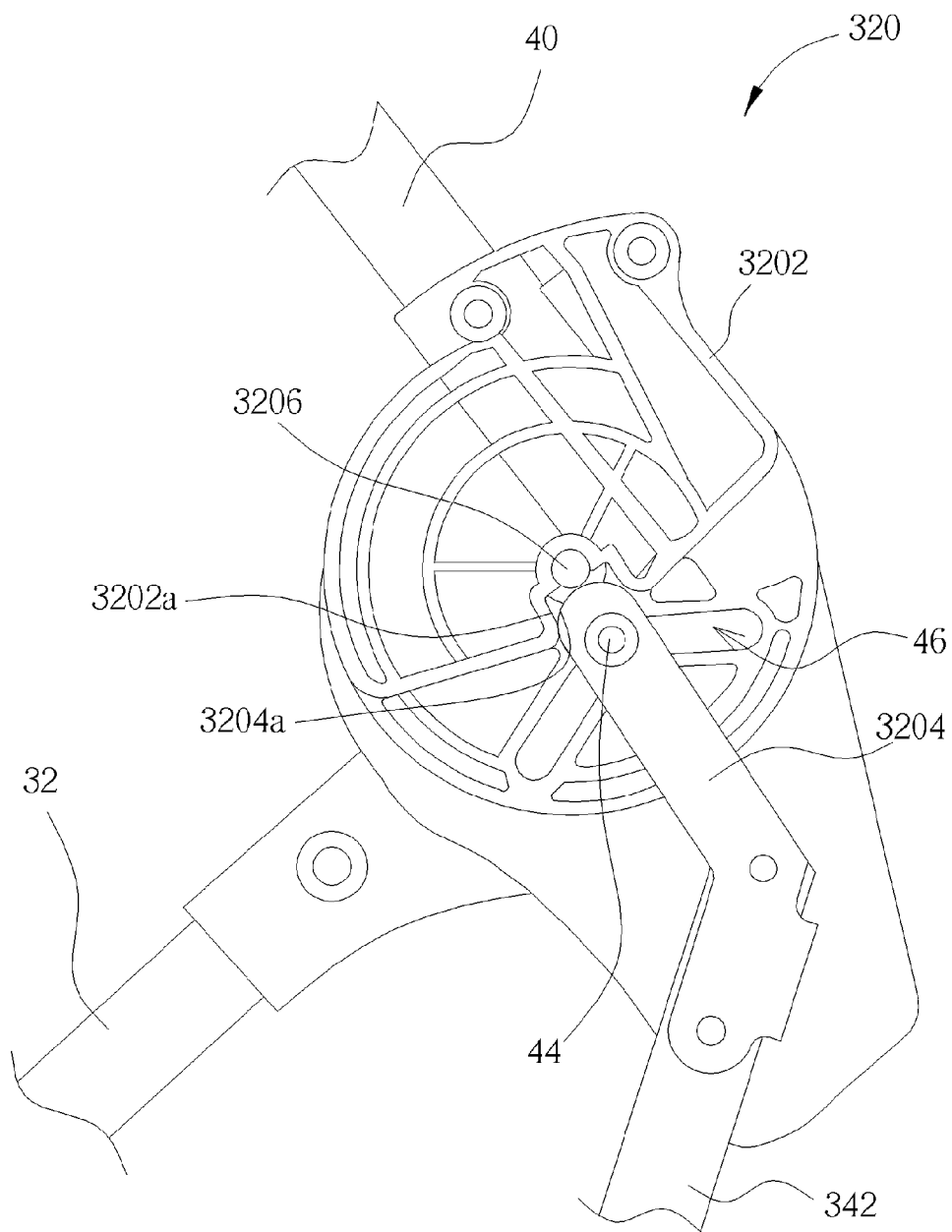
Figure 12:
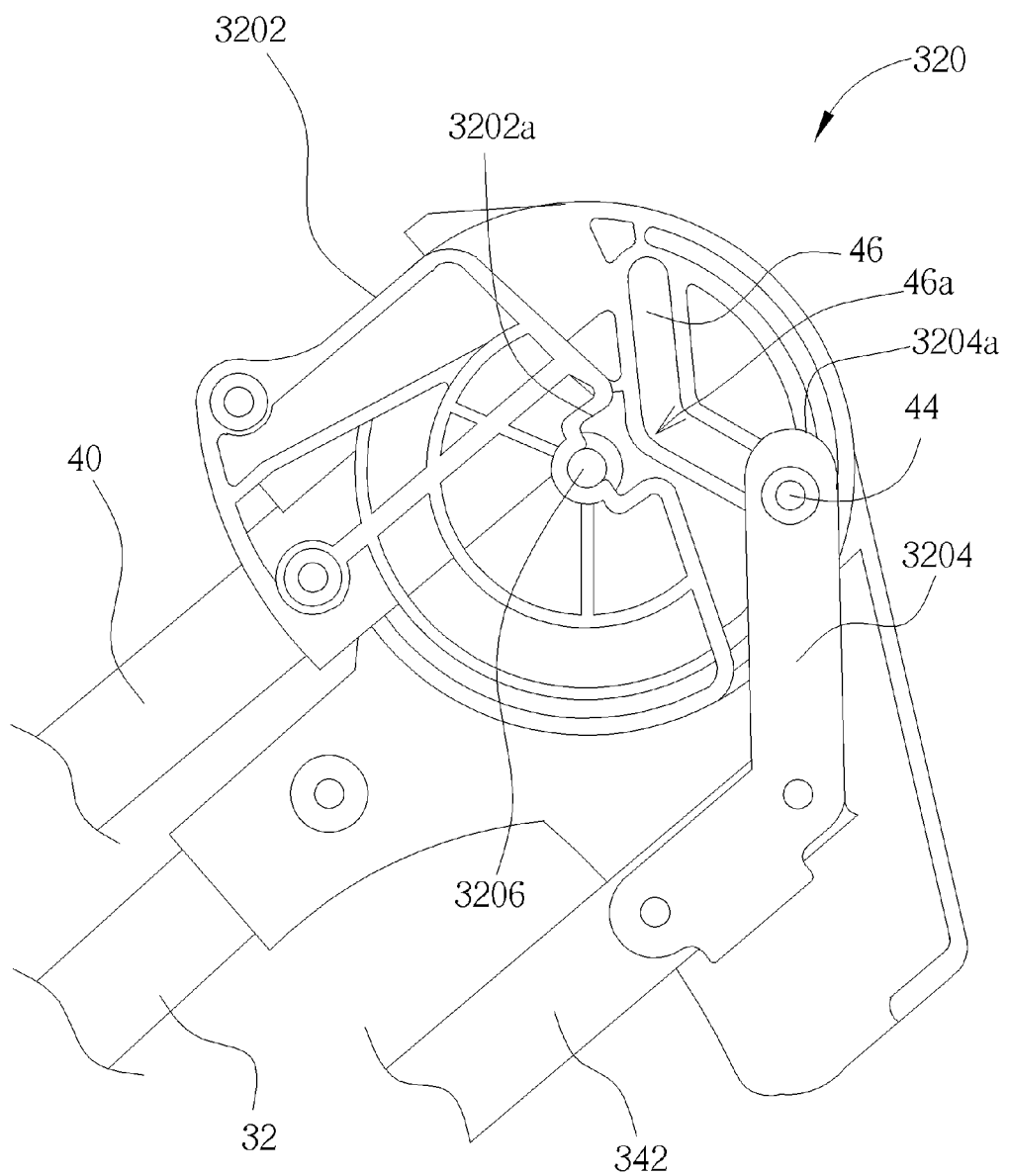

Referring to FIGS. 9 and 12, FIG. 9 is a schematic diagram illustrating the folding mechanism 320 shown in FIG. 5, and FIGS. 10 to 12 show inside details of the folding mechanism 320 as it goes through its fold sequence. The folding mechanism 320 is located at the junction of the upper carriage 32, foldable support assembly 34 and handle frame 40. The folding mechanism 320 comprises amount 3200, a pivoting actuator 3202 and a drive link 3204. The pivoting actuator 3202 is pivotally connected to the mount 3200 at a pivoting axis 3206. The drive link 3204 is mounted rigidly to the upper support member 342 of the foldable support assembly 34. The drive link 3204 has two sides which are mounted on opposite sides of the pivoting actuator 3202 in a path driven connection. As the handle frame 40 pivots forward about the pivoting axis 3206 (counter-clockwise) within the mount 3200, the cam pin 44 follows the path of the cam slot 46 and an arc groove 3200a of the mount 3200, which in turn drives the drive link 3204, as shown in FIGS. 10 to 12. The cam slot 46 is formed with an angular portion 46a. It should be noted that a front end 3204a of the drive link 3204 contacts a guide notch 3202a of the pivoting actuator 3202 in FIG. 11, cooperating with the angular portion 46a in order to prevent the folding mechanism 320 from backward movement in the cam slot 46 during folding sequence. In other words, the cam pin 44 would travel in one direction as the handle frame 40 is pivoted. Basically, when the handle frame 40 or the pivoting actuator 3202 rotates clockwise, it drives the cam pin 44 through the cam slot 46. At the midpoint of this rotation, the front end 3204a of the drive link 3204 comes in contact with the guide notch 3202a of the pivoting actuator 3202, so the cam pin 44 cannot reverse direct.

The rotating drive link 3204 causes the upper support member 342 of the foldable support assembly 34 to rotate in the opposite direction (clockwise) as the handle frame 40 is being rotated, which drives the foldable support assembly 34 to a folded state. In this embodiment, a distance d1 from the cam pin 44 to the front end 3204a of the drive link 3204 is greater than a distance d2 from the cam pin 44 to a side 3204b of the drive link 3204, as shown in FIG. 10, so as to prevent misdirection of the cam pin 44 in the cam slot 46 while the handle frame 40 and the foldable support assembly 34 rotate.

Figure 13:
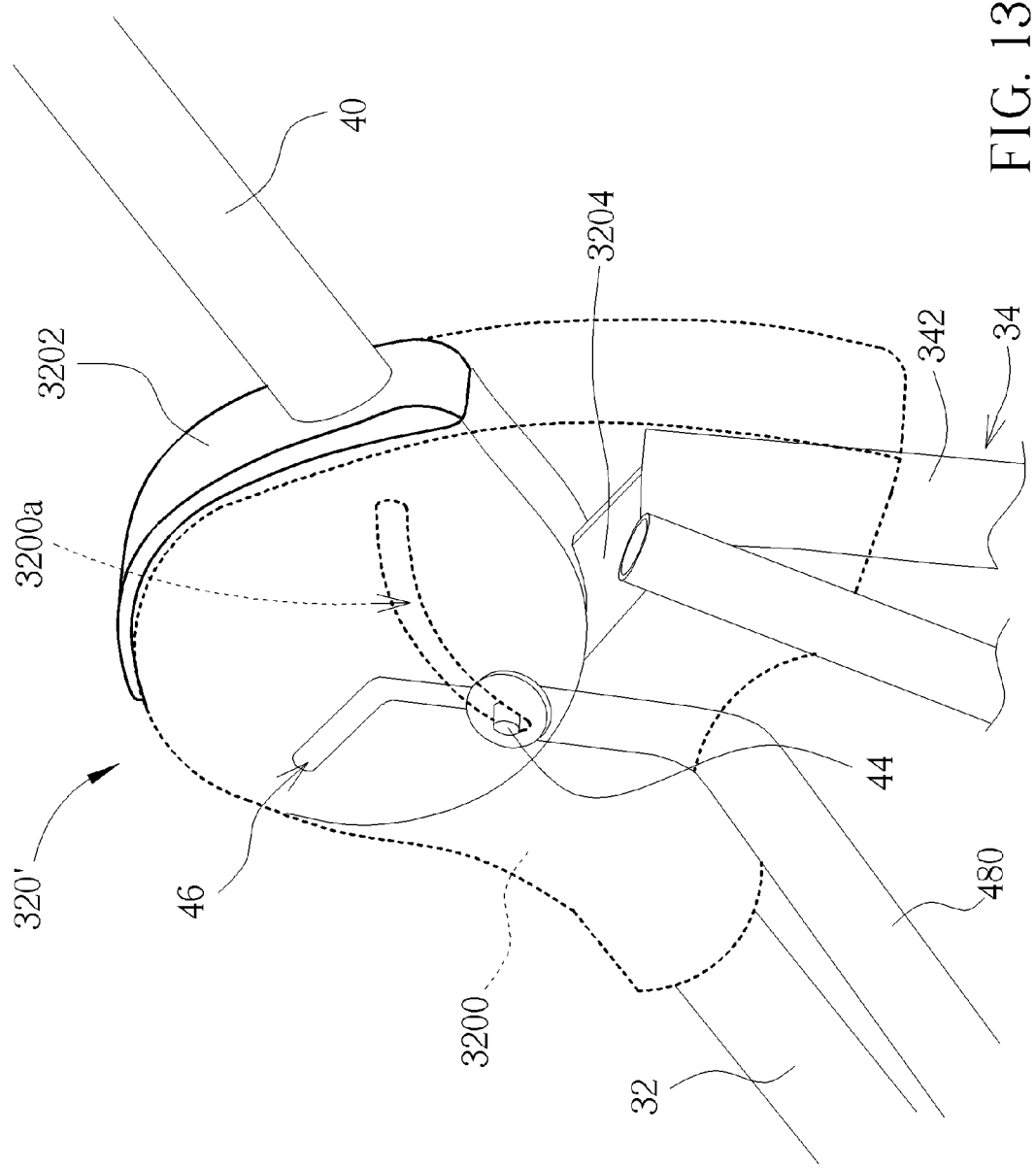
FIG. 13 is a schematic diagram illustrating a folding mechanism according to another embodiment of the invention.

Referring to FIG. 13, FIG. 13 is a schematic diagram illustrating a folding mechanism 320' according to another embodiment of the invention. As shown in FIG. 13, the drive link 3204 is centrally positioned within the pivoting actuator 3202. The function of the folding mechanism 320' is the same as the aforesaid folding mechanism 320, and it is not depicted herein.

Further, as shown in FIG. 5, the stroller 3 may further comprise a tray 48. As shown in FIG. 7, the tray 48 is connected to the drive link 3204 through a fold link 480. Please refer to FIG. 9. In this embodiment, the fold link 480 is also pulled rearward, as the cam pin 44 follows the path of the cam slot 46 and the arc groove 3200a, which drives the tray 48 to a folded state. That is to say, when the stroller 3 is folded, the drive link 3240 will drive the tray 48 to a folded position.

Figure 14:
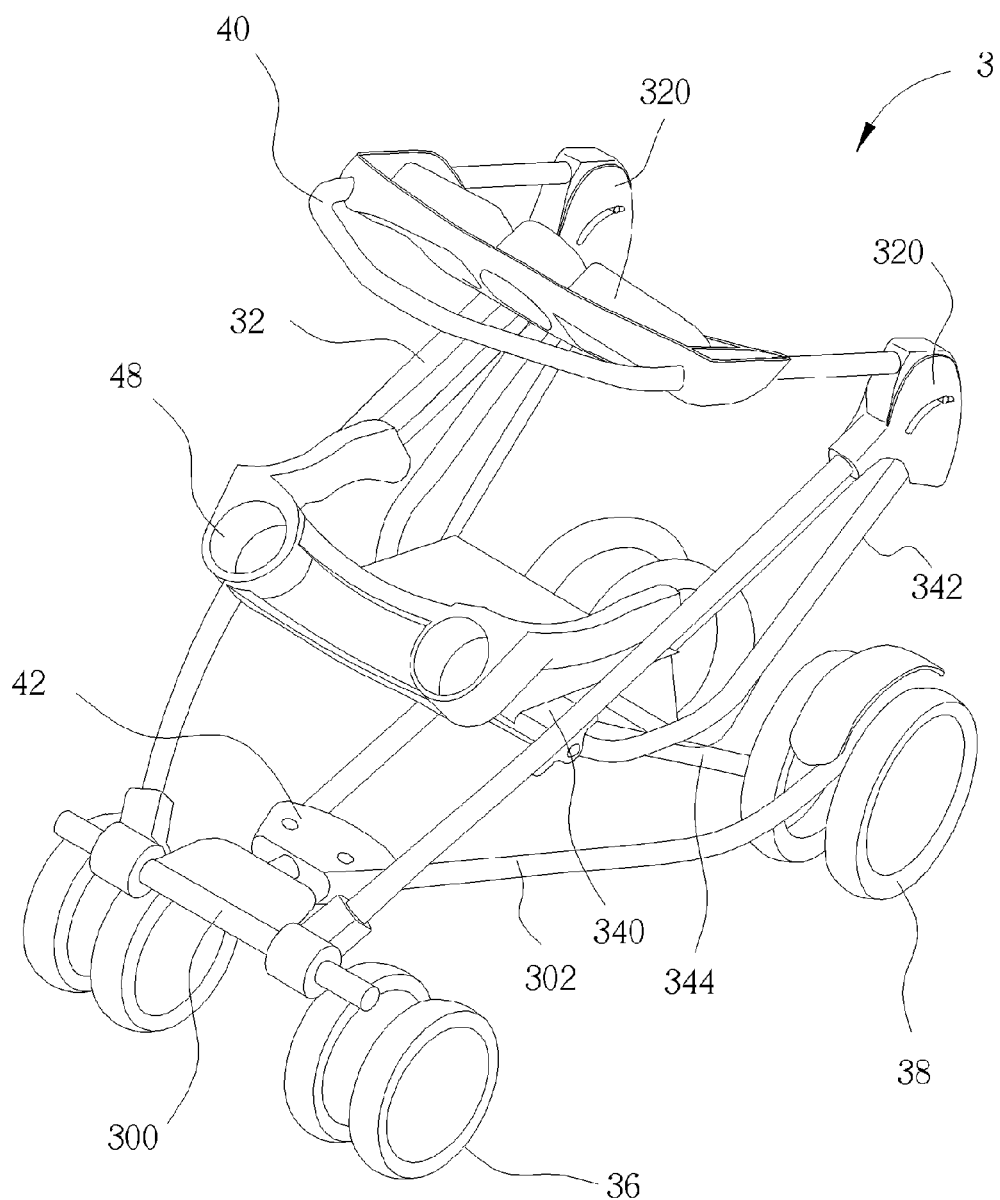
FIGS. 14 and 15 show fold sequence of the stroller shown in FIG. 5.
Figure 15:
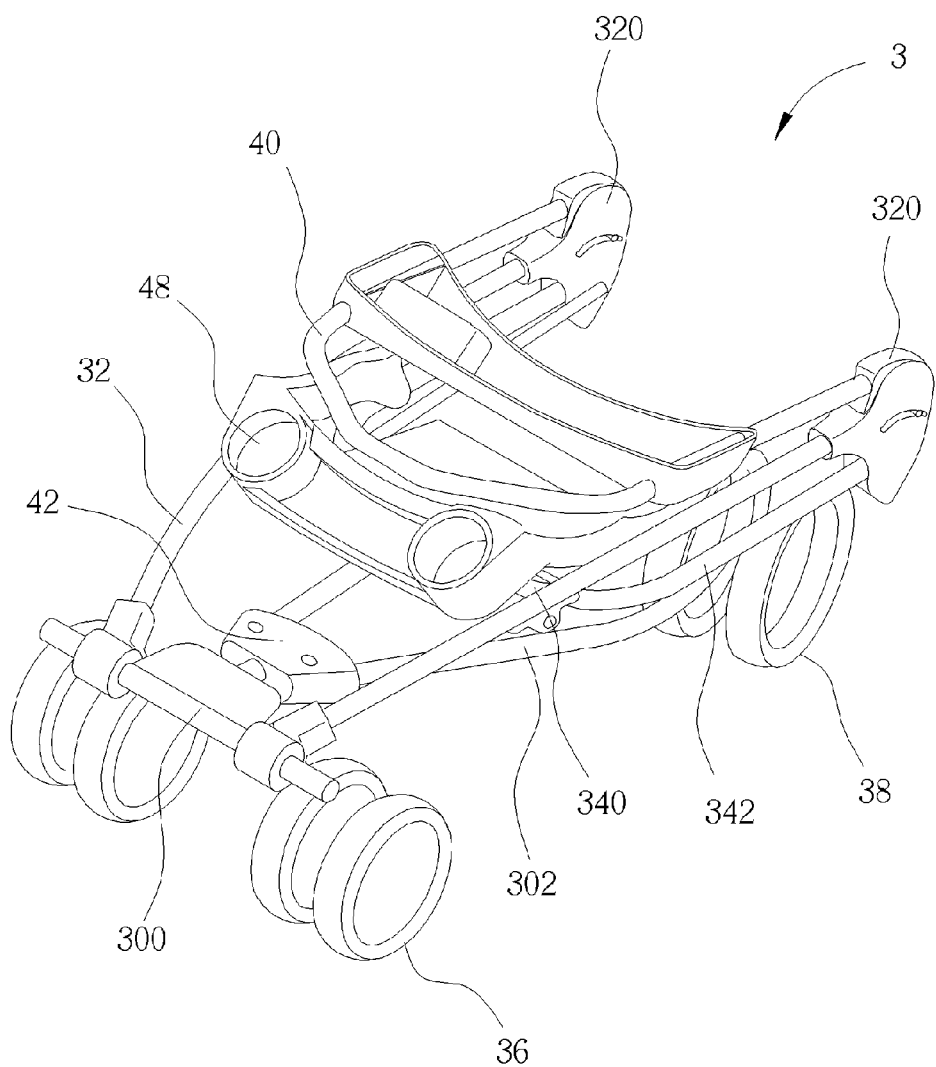
Figure 16:
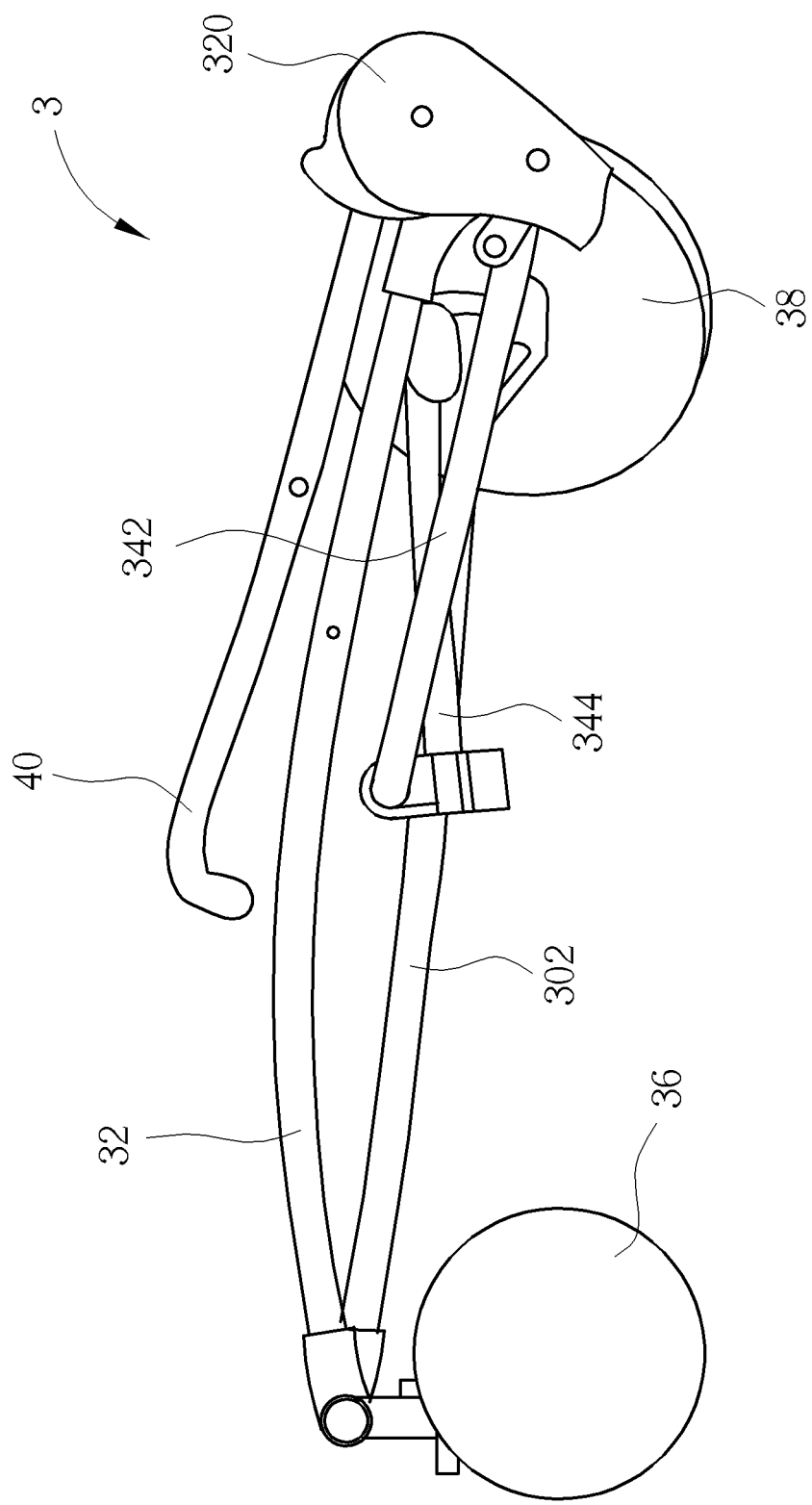
FIG. 16 is a side view illustrating the stroller shown in FIG. 15.

Referring to FIGS. 14 to 16, FIGS. 14 and 15 show fold sequence of the stroller 3 shown in FIG. 5, and FIG. 16 is a side view illustrating the stroller 3 shown in FIG. 15. In this embodiment, the handle frame 40 is configured as, but not limited to, a U-shaped member. The ends of the handle frame 40 are rigidly connected to the pivoting actuator 3202 of the folding mechanism 320. When the handle frame 40 rotates forward, the pivoting actuator 3202 controls the drive link 3204 to rotate which in turn causes the upper support member 342 of the foldable support assembly 34 to rotate forward. As the upper support member 342 rotates forward, since the angle between the lower support members 344 is fixed, the connecting member 340 moves forward causing the lower support members 344 to pull the rear legs 302 inwardly and allows the upper carriage 32 to fold down onto the lower carriage 30, as shown in FIGS. 14 and 15. As the frame of the stroller 3 folds, the lower support members 344 pull the rear legs 302 inward so that, when in the completely folded position, the rear wheels 38 lie within the frame of the stroller 3, as shown in FIG. 16. This allows for a more compact fold and convenient package size. Preferably, for purpose of pulling the rear legs 302 inward, the lower support members 344 are substantially parallel to the rear legs 302 when the stroller 3 is folded. Furthermore, when the stroller 3 is unfolded, the fixed angle α between the lower support members 344 may be smaller than an angle β between the rear legs 302.

Compared to the prior art, as mentioned in the above, the stroller of the invention has the ruggedness, features and safety of a full-sized stroller, but when folded, meets the weight and size requirements of a lightweight stroller. The fusion of elements creates a meeting point between full-sized and lightweight strollers, thus extending comfort and usability of the stroller in a variety of situations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
   a lower carriage;
   an upper carriage pivotally connected to the lower carriage; and
   a foldable support assembly comprising:
      a connecting member;
      an upper support member, one end of the upper support member being pivotally connected to the upper carriage; and
      a lower support member, one end of the lower support member being pivotally connected to the lower carriage;
   wherein at least one of the other end of the upper support member and the other end of the lower support member is pivotally connected to the connecting member,
   wherein the upper carriage comprises a folding mechanism, the folding mechanism comprises a mount, a pivoting actuator and a drive link, the pivoting actuator is pivotally connected to the mount at a pivoting axis, the drive link is mounted rigidly to the upper support member and to the pivoting actuator, and the drive link is mounted to the pivoting actuator by a cam pin movably disposed in a cam slot of the mount.

2. The stroller of claim 1, wherein the connecting member comprises an operating portion, when the operating portion is actuated, the upper support member rotates with respect to the upper carriage and the lower support member rotates with respect to the lower carriage and the connecting member, so as to fold down the upper carriage onto the lower carriage.

3. The stroller of claim 1, wherein the lower carriage comprises a front wheel frame and two rear legs, the two rear legs are connected to the front wheel frame horizontally, and the upper carriage is pivotally connected to the front wheel frame.

4. The stroller of claim 1, further comprising a handle frame pivotally connected to the upper carriage.

5. The stroller of claim 1, wherein the lower carriage comprises a front wheel frame, a mounting member and two rear legs, the mounting member is connected to the front wheel frame, the two rear legs are horizontally and pivotally connected to the mounting member such that the two rear legs are rotatable inwardly to each other when the upper support member rotates with respect to the lower support member about the connecting member, and the upper carriage is pivotally connected to the front wheel frame.

6. The stroller of claim 5, wherein the lower support member is pivotally connected to the two rear legs by two mount brackets.

7. The stroller of claim 1, wherein a distance from the cam pin to a front end of the drive link is greater than a distance from the cam pin to a side of the drive link.

8. The stroller of claim 1, further comprising a handle frame rigidly connected to the pivoting actuator, when the handle frame rotates forward, the pivoting actuator controls the drive link to rotate which in turn causes the upper support member to rotate forward.

9. The stroller of claim 1, further comprising a tray connected to the drive link, wherein when the stroller is folded, the drive link drives the tray to a folded position.

10. The stroller of claim 1, wherein the stroller comprises two lower support members and a fixed angle is between the two lower support members while the two lower support members rotate with respect to the connecting member.

11. The stroller of claim 10, wherein the connecting member has two grooves, and each of the two lower support members is pivotally connected in one groove of the connecting member correspondingly.

12. The stroller of claim 1, wherein the connecting member has a slot, the upper support member has a protruding member disposed in the slot, and the slot allows the protruding member to rotate along with the upper support member in unfolded and folded positions.

13. The stroller of claim 1, wherein the cam slot has an angular portion, and the cam slot has a V-shape.

14. The stroller of claim 13, wherein the pivoting actuator contains a guide notch adjacent to the pivoting axis, and a front end of the drive link inserts into the guide notch when the cam pin is located at the angular portion of the cam slot.

15. A stroller comprising:
   a lower carriage comprising a front wheel frame and two rear legs, the two rear legs being connected to the front wheel frame horizontally via a mounting member, the two rear legs being pivotally connected to the mounting member such that the two rear legs are rotatable inwardly to each other;
   an upper carriage pivotally connected to the front wheel frame; and
   a foldable support assembly comprising:
      a connecting member;
      an upper support member, one end of the upper support member being pivotally connected to the upper carriage; and
      a lower support member, one end of the lower support member being pivotally connected to the lower carriage;
   wherein at least one of the other end of the upper support member and the other end of the lower support member is pivotally connected to the connecting member, and the two rear legs are rotatable inwardly to each other when the upper support member rotates with respect to the lower support member about the connecting member,
   wherein the upper carriage comprises a folding mechanism, the folding mechanism comprises a mount, a pivoting actuator and a drive link, the pivoting actuator is pivotally connected to the mount at a pivoting axis, the drive link is mounted rigidly to the upper support member and to the pivoting actuator, and the drive link is mounted to the pivoting actuator by a cam pin movably disposed in a cam slot of the mount.

16. The stroller of claim 15, wherein a distance from the cam pin to a front end of the drive link is greater than a distance from the cam pin to a side of the drive link.

17. The stroller of claim 15, wherein the stroller comprises two lower support members and a fixed angle is between the two lower support members while the two lower support members rotate with respect to the connecting member.

18. The stroller of claim 17, wherein the connecting member has two grooves, and each of the two lower support members is pivotally connected in one groove of the connecting member correspondingly.

19. The stroller of claim 17, wherein when the stroller is unfolded, the fixed angle between the two lower support members is smaller than an angle between the two rear legs.

20. The stroller of claim 15, wherein when the stroller is folded, the two lower support members are substantially parallel to the two rear legs.

21. The stroller of claim 15, wherein the cam slot has an angular portion, and the cam slot has a V-shape.

22. The stroller of claim 21, wherein the pivoting actuator contains a guide notch adjacent to the pivoting axis, and a front end of the drive link inserts into the guide notch when the cam pin is located at the angular portion of the cam slot.

* * * * *